(12) United States Patent
Koch (10) Patent No.: US 11,415,024 B2
(45) Date of Patent: Aug. 16, 2022

(54) BEARING HOUSING OF AN EXHAUST-GAS TURBOCHARGER

(71) Applicant: BorgWarner Inc., Auburn Hills, MI (US)

(72) Inventor: Silvio Koch, Kirchheimbolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 1083 days.

(21) Appl. No.: 14/378,991

(22) PCT Filed: Feb. 11, 2013

(86) PCT No.: PCT/US2013/025530
§ 371 (c)(1),
(2) Date: Aug. 15, 2014

(87) PCT Pub. No.: WO2013/126231
PCT Pub. Date: Aug. 29, 2013

(65) Prior Publication Data
US 2015/0330253 A1 Nov. 19, 2015

(30) Foreign Application Priority Data

Feb. 20, 2012 (DE) ...................... 10 2012 003 420.2

(51) Int. Cl.
*F01D 25/24* (2006.01)
*F01D 25/18* (2006.01)
*F01D 25/00* (2006.01)
*F01D 25/16* (2006.01)
(Continued)

(52) U.S. Cl.
CPC ........... *F01D 25/24* (2013.01); *F01D 25/005* (2013.01); *F01D 25/16* (2013.01); *F01D 25/183* (2013.01);
(Continued)

(58) Field of Classification Search
CPC ............. F04D 29/0462; F04D 29/0563; F04D 29/122; F05B 2220/40; F05B 2230/604;
(Continued)

(56) References Cited

U.S. PATENT DOCUMENTS 4,329,000 A * 5/1982 Keske ...................... F01D 25/16
384/464
4,457,523 A * 7/1984 Halling ................... F16J 15/021
277/644

(Continued)

FOREIGN PATENT DOCUMENTS

EP 2302175 A1 3/2011

OTHER PUBLICATIONS

International Search Report in International Application No. PCT/US2014/025530, dated Jun. 2, 2013.

*Primary Examiner* — Dominick L Plakkoottam
*Assistant Examiner* — Charles W Nichols
(74) *Attorney, Agent, or Firm* — Eric L. Doyle; Stephan A. Pendorf; Patent Central LLC (57) ABSTRACT

A bearing housing (1) of an exhaust-gas turbocharger (2), having a bearing cartridge (4), arranged in a bearing housing borehole (3), for a rotor (5), and having an oil film (6), which surrounds the bearing cartridge (4) on the outer circumferential surface (7) thereof. Provision is made of at least one decoupling/sealing element (8, 9), which is formed as a spring steel ring, and which is elastically tensioned between a first associated bearing cartridge end region (10) and an adjacently arranged bearing housing wall region (11).

7 Claims, 8 Drawing Sheets (51) Int. Cl.
*F16C 19/18* (2006.01)
*F16C 27/04* (2006.01)

(52) U.S. Cl.
CPC .......... *F16C 19/184* (2013.01); *F16C 27/045* (2013.01); *F05D 2220/40* (2013.01); *F16C 2360/24* (2013.01)

(58) Field of Classification Search
CPC .............. F05B 2240/50; F05B 2240/54; F05B 2240/55; F05B 2240/58; F05B 2240/581; F05B 2240/57; F05D 2240/50; F05D 2240/54; F05D 2240/55; F05D 2240/58; F05D 2240/581; F05D 2220/40; F16C 27/04; F16C 27/045; F16C 2360/24; F16C 19/184; F01D 11/00; F01D 11/03; F01D 25/005; F01D 25/16; F01D 25/162; F01D 25/183; F01D 25/24; F01D 25/243
See application file for complete search history.

(56) References Cited

U.S. PATENT DOCUMENTS

| | | | |
|---|---|---|---|
| 6,209,884 B1* | 4/2001 | Taudt | F16J 15/0887 277/607 |
| 7,025,579 B2* | 4/2006 | Woollenweber | F02C 7/06 417/407 |
| 7,108,488 B2* | 9/2006 | Larue | F16C 17/024 384/103 |
| 7,789,636 B2 | 9/2010 | Liebl et al. | |
| 2002/0039461 A1* | 4/2002 | Obara | F16C 19/18 384/535 |
| 2005/0210875 A1 | 9/2005 | Larue et al. | |
| 2010/0260450 A1* | 10/2010 | Larue | F16C 27/02 384/536 |
| 2011/0038742 A1 | 2/2011 | Fleig et al. | |
| 2012/0023931 A1 | 2/2012 | House et al. | |

* cited by examiner

BEARING HOUSING OF AN EXHAUST-GAS TURBOCHARGER

BACKGROUND OF THE INVENTION

Field of the Invention

The invention relates to a bearing housing of an exhaust-gas turbocharger and also to an exhaust-gas turbocharger.

Description of the Related Art

For mounting the rotor and for absorbing the operational forces, a large number of turbochargers of the generic type make use of a bearing cartridge or a bearing insert which is arranged in the bearing housing of the exhaust-gas turbocharger.

In order to make it possible to achieve a harmonious profile of the wave path and of the noise emissions, an oil film can be placed around the cartridge and serves as a noise damper.

The disadvantage of this structural system, however, is that oil may flow in an uncontrolled manner in the direction of the rotor seals, which may lead to increased emissions of exhaust gas. Furthermore, this partial oil flow which flows away is lost for the system damping and cooling.

It is an object of the present invention, therefore, to provide a bearing housing of an exhaust-gas turbocharger and also an exhaust-gas turbocharger which make it possible to eliminate the disadvantages mentioned above.

BRIEF SUMMARY OF THE INVENTION

Since the decoupling/sealing element or elements, which can be produced, for example, from a metallic material by a forming process, may have both a resilient and a sealing action, there is firstly the advantage that the cartridge is always centered in the middle of the bearing housing borehole. A homogeneous oil film can thereby form around the entire bearing cartridge.

Furthermore, the arrangement according to the invention provides the advantage that the surfaces for transmitting structure-borne sound can be reduced.

In addition, the oil flow in the bearing housing can be channeled, and it is therefore possible to use a rotor having a reduced balance quality and to thereby reduce the outlay for manufacturing the bearing housing according to the invention and also the exhaust-gas turbocharger according to the invention.

Although it is known from DE 10 2008 04886 A1 and EP 2042758 A2 to place sleeves, in the first case made of an elastomer or a plastic and in the second case made of a wire mesh, around a bearing cartridge, these can fulfill only a limited sealing and damping function on account of their material and their shaping.

In contrast to this, it is possible, on account of the design of the bearing housing and of the bearing cartridge and also of the combined decoupling/sealing elements, to elastically tension the latter after they have been inserted into the bearing housing borehole, which means that they can move radially to a minimal extent. Furthermore, the design of the decoupling/sealing elements according to the invention provides the further advantage of sealing the damping gap at the two ends of the bearing cartridge.

It is thereby possible for the oil damping film to form better between the bearing cartridge and the bearing housing or the bearing housing borehole.

The transmission of the structure-borne sound can be at least reduced or minimized by the design according to the invention in that the decoupling and sealing elements are supported on the walls by means of linear contact, and the oil volume around the cartridge can be utilized as further damping means for the structure-borne sound and the wave path.

BRIEF DESCRIPTION OF THE SEVERAL VIEWS OF THE DRAWINGS

The arrangement according to the invention thus forms a spring/mass/damper system.

The dependent claims contain advantageous developments of the invention.

Further details, features and advantages emerge from the following description of exemplary embodiments on the basis of the drawing, in which.

DETAILED DESCRIPTION OF THE INVENTION

Figure 1:
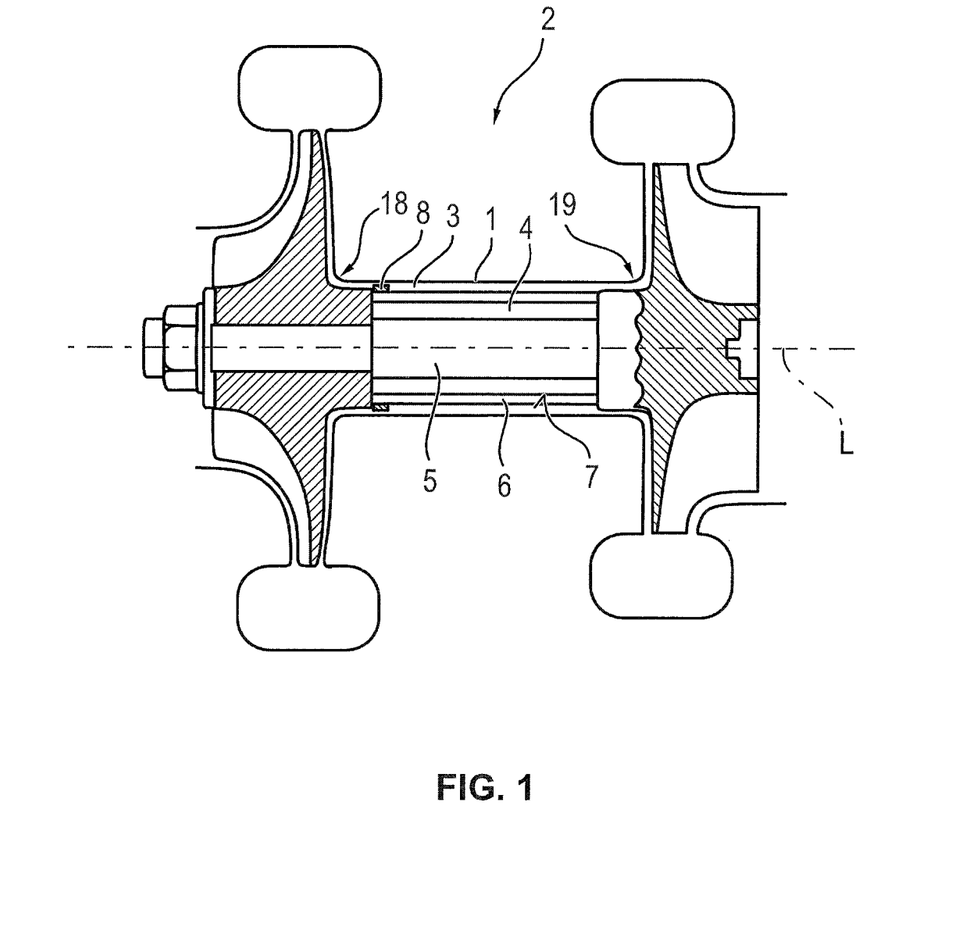
FIG. 1 shows a schematically greatly simplified illustration of an exhaust-gas turbocharger according to the invention.

FIG. 1 shows an exhaust-gas turbocharger 2 according to the invention, which has a compressor 18 and a turbine 19. The bearing housing 1 according to the invention is arranged between the compressor 18 and the turbine 19 and serves to mount a rotor 5, at the end regions of which the compressor or turbine wheel is arranged. To mount the rotor 5, provision is made of a bearing cartridge 4, which, like all the other parts of the exhaust-gas turbocharger 2 as per the illustration chosen in FIG. 1, is shown only in greatly schematic form. The bearing cartridge 4 is surrounded by an oil film 6.

Furthermore, according to the invention at least one decoupling/sealing element 8 is arranged at at least one end region of the bearing cartridge 4, with such an element preferably being provided at each of the two end regions of the bearing cartridge 4. The structure of these decoupling/sealing elements will be explained in detail hereinbelow on the basis of FIGS. 2 to 5. The exhaust-gas turbocharger 2 shown in FIG. 1 of course also has all the other components necessary for the structure and the mode of operation, but these are not shown in detail, since the explanation thereof is not needed for explaining the principles of the present invention.

Figure 2:
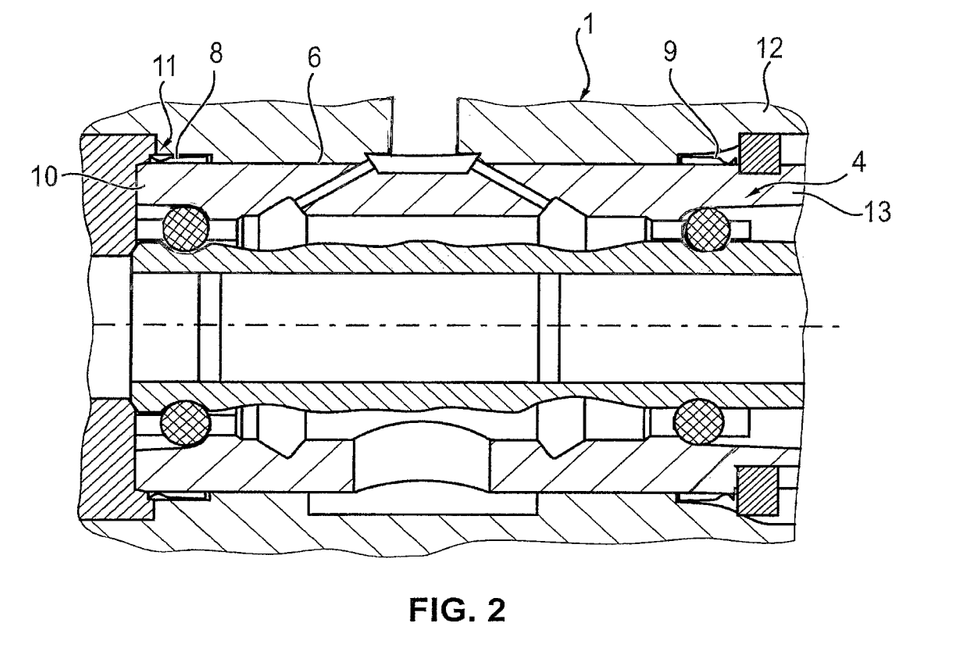
FIG. 2 shows a schematically simplified illustration of a bearing housing according to the invention in a general view.

FIG. 2 shows a schematically simplified general illustration of the bearing housing 1. The bearing housing 1 has the bearing cartridge 4 in the bearing housing borehole 3 therein (shown in FIG. 1).

In the particularly preferred embodiment shown in FIG. 1, provision is made of two decoupling/sealing elements 8 and 9, which are arranged at the two end regions of the bearing cartridge 4 between the latter and the adjacent bearing housing wall. In detail, the decoupling/sealing element 8, which is formed as a metallic ring, e.g. as a spring steel ring, is arranged and elastically tensioned between a first associated end region 10 of the bearing cartridge 4 and an adjacent wall region 11 of the bearing housing 1.

The second decoupling/sealing element 9 is likewise formed as a metallic ring and arranged and likewise elastically tensioned between a second associated end region 13 in the bearing cartridge 4 and an adjacent wall region 12 of the bearing housing 1. In this case, the elastic tensioning of the elements 8 and 9 means that they can move to a minimal extent in the radial direction of the bearing housing 1. This arrangement primarily leads to the advantage that the cartridge can be centered in the middle of the bearing housing borehole 3 and that a homogeneous oil film 6 can form around the entire bearing cartridge 4.

Figure 3:
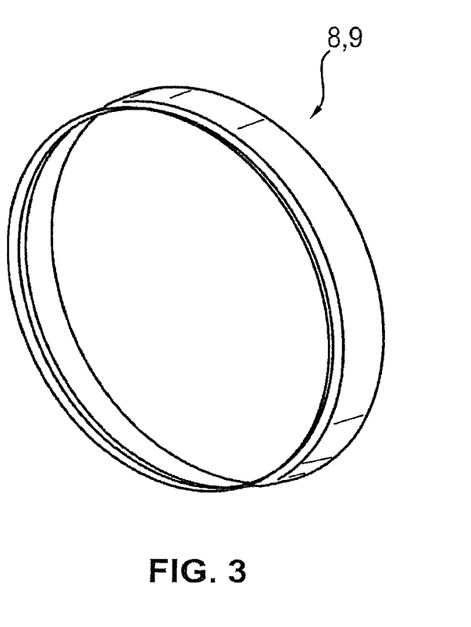
FIG. 3 shows a perspective illustration of an embodiment of a decoupling/sealing element.
Figure 4:
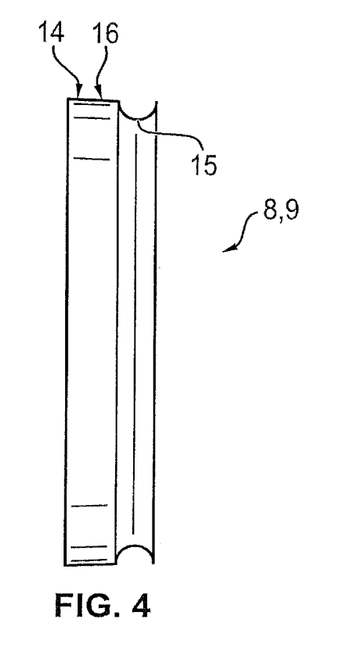
FIG. 4 shows a side view of the element shown in FIG. 3.
Figure 6:
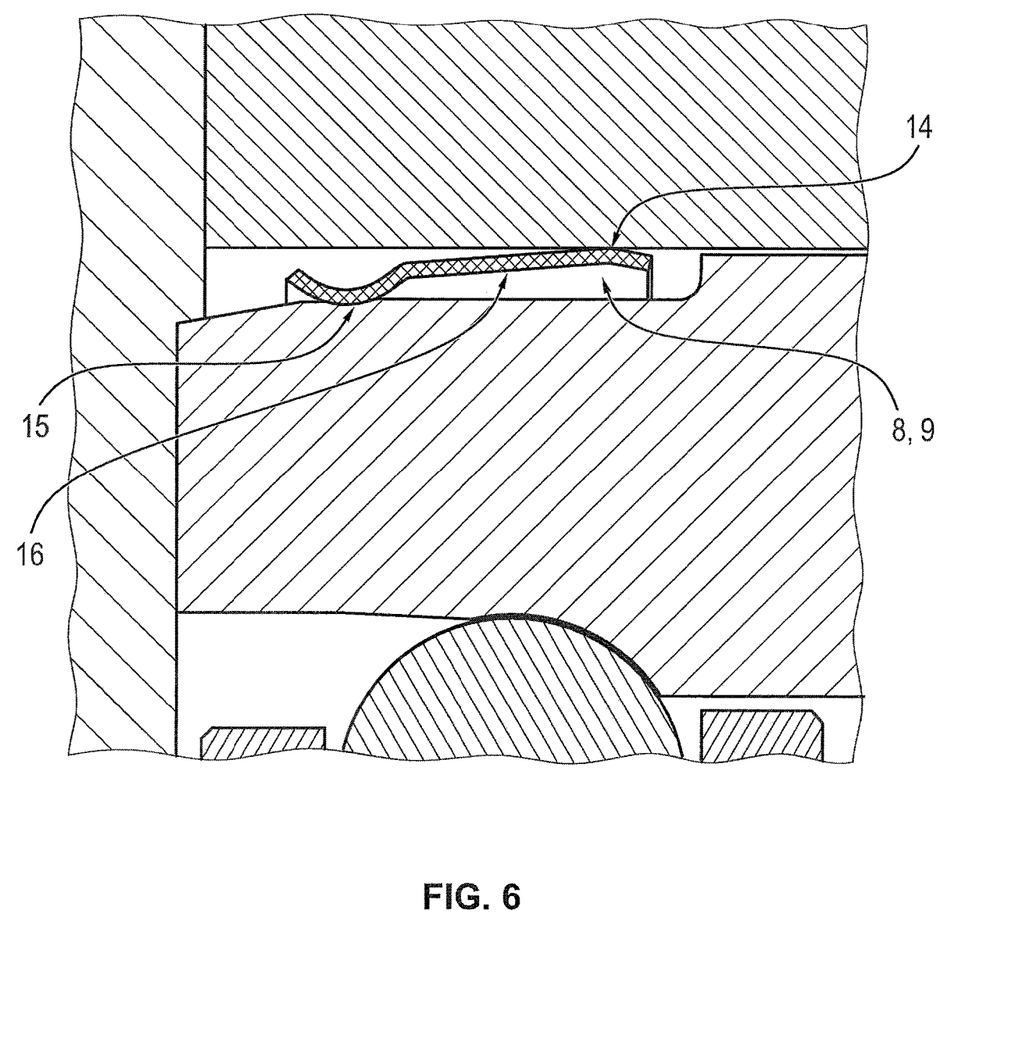

The design of the decoupling/sealing elements 8 and 9 can be seen in detail from the illustration in FIGS. 3, 4 and 6. FIG. 3 shows that these elements 8 and 9 are, in the example, circular rings made of metal, the dimensioning of which can be adapted to the respective application. It is apparent from FIG. 4 that the elements 8 and 9 each have at least one resilient region 16 between at least two sealing regions 14 and 15. One sealing region is supported on the bearing cartridge 4 and the other sealing region is supported on the bearing housing 1. The sealing regions 14 and 15 of the decoupling element 8, 9 may also be supported on a bearing housing insert or a bearing housing cover.

Figure 8:
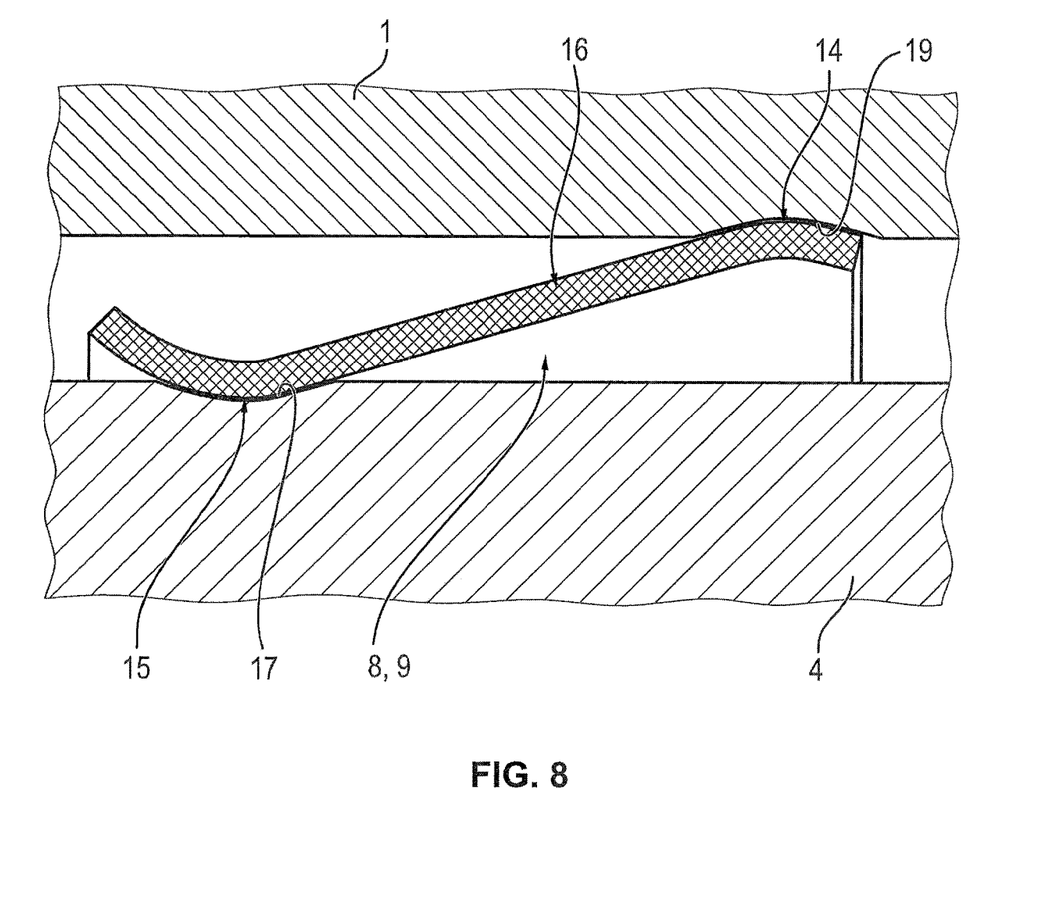
Figure 10:
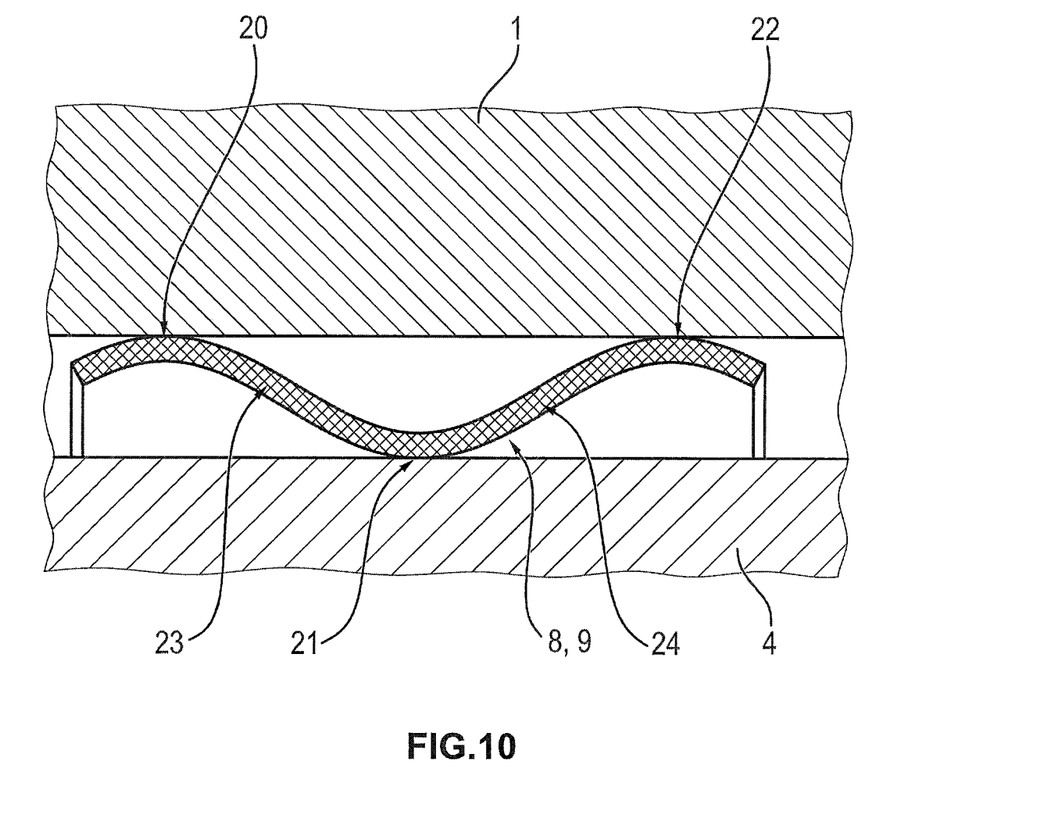

As shown in FIG. 10, it is furthermore also possible to design the elements 8, 9 with two resilient regions 23, 24 and three sealing regions 20, 21, 22. The sites at which the sealing regions 20, 21, 22 of the decoupling elements 8, 9 make contact may either be arranged directly on the lateral surfaces of the bearing housing 1 or cartridge 4, or else also in grooves 17, 19 in said lateral surfaces (see FIG. 8). It is also possible to design the metallic ring 8, 9 with a slot or joint and to leave this joint open or to weld it.

Figure 5:
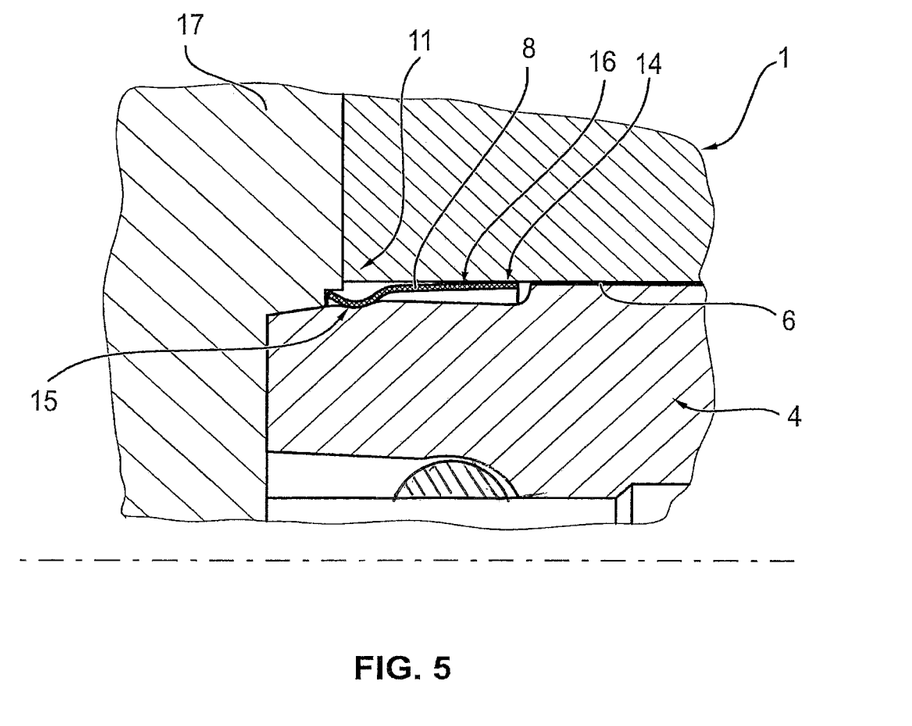
FIG. 5 shows a detailed illustration of the bearing housing as per the embodiment shown in FIG. 2, and FIGS. 6-10 show schematically simplified illustrations of embodiment variants of the decoupling/sealing element according to the invention.

As shown in FIG. 5, the sealing regions 14 and 15 lie against the adjacent wall region 11 of the bearing housing 1 or cartridge 4 by means of linear contact, as a result of which uncontrolled runoff of oil from the oil film 6 can be prevented.

Figure 7:
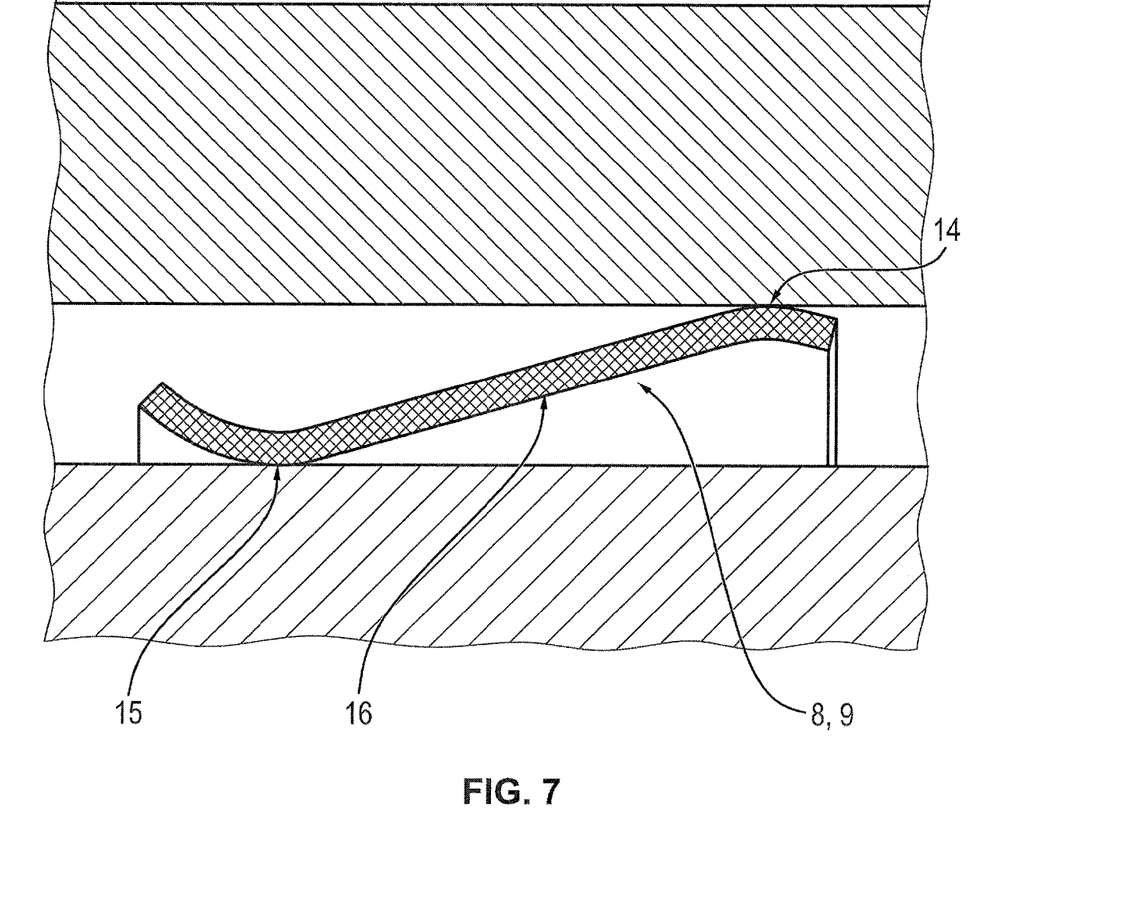

FIG. 7 shows a further embodiment of the decoupling/sealing element 8, 9 according to the invention, in which provision is made in turn of two end sealing regions 14 and 15, which are each rounded. The resilient region 16, which in this embodiment has a rectilinear form, extends between said sealing regions 14 and 15.

Figure 9:
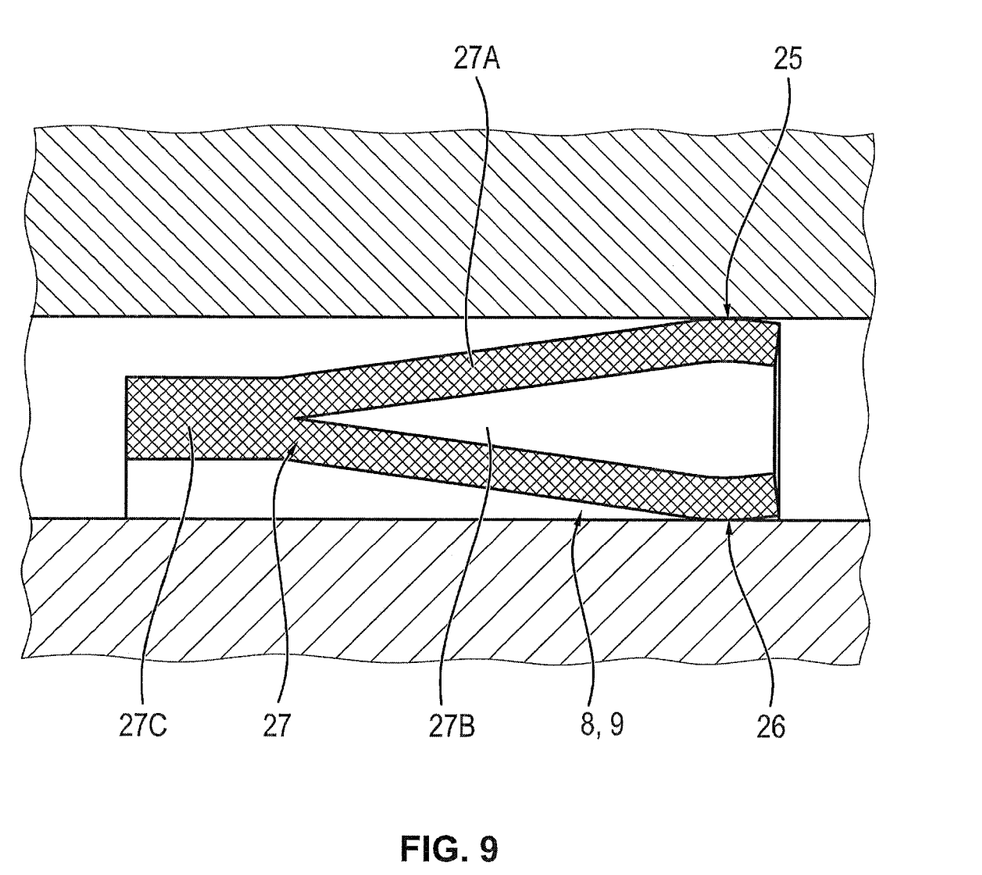

As already mentioned above, FIG. 8 shows in principle the embodiment as per FIG. 7, although grooves 17 and 19 are provided in the bearing housing 1 or the cartridge 4. FIG. 9 shows a further possible embodiment of the decoupling/sealing elements 8, 9 according to the invention, which in this case have a Y-like configuration. Accordingly, this forms legs 27A and 27B at the end of a resilient region 27 and sealing regions 25 and 26 at the ends thereof, with a slightly rounded form. The legs 27A and 27B are discontinued in a base region 27C of the resilient region 27, as can be seen in detail from FIG. 9.

In addition to the above written disclosure of the invention, reference is hereby explicitly made to the illustrative representation thereof in FIGS. 1 to 10.

LIST OF REFERENCE SIGNS

1 Bearing housing
2 Exhaust-gas turbocharger
3 Bearing housing borehole
4 Bearing cartridge
5 Rotor
6 Oil film
7 Outer circumferential surface
8, 9 Decoupling/sealing elements
10 Bearing cartridge end region
11 Bearing housing wall region
12 Bearing housing wall region
13 Bearing cartridge end region
14 Sealing region
15 Contact point
16 Resilient region
17 Groove
18 Compressor
19 Groove
20, 21, 22 Sealing region
23, 24 Resilient region
25, 26 Sealing region
27 Resilient region
27A, 27B Leg
27C Base region
L Longitudinal charger axis

The invention claimed is:

1. A bearing housing (1) of an exhaust-gas turbocharger (2), comprising:

an oil-lubricated bearing cartridge (4) having a one-piece cylindrical outer race having a circumferential surface (7) and having a first end region (10) and a second end region (13), wherein the bearing cartridge (4) is a rolling bearing system;

a bearing housing borehole (3) having a cylindrical inner circumferential surface having a first wall region (11) surrounding said bearing cartridge first end region (10) and a second wall region (12) surrounding said bearing cartridge second end region (13);

the bearing housing borehole first wall region (11) having an inner diameter greater than the bearing cartridge first end region (10) outer diameter, forming a gap between the first cartridge end region outer diameter and the bearing housing borehole first wall region, the bearing housing borehole second wall region (12) having an inner diameter greater than the bearing cartridge second end region (13) outer diameter, forming a gap between the second cartridge end region outer diameter (13) and the bearing housing borehole second wall region (12), a first ring-shaped metallic decoupling and sealing element (8), said first ring-shaped metallic decoupling and sealing element (8) elastically deformable between an untensioned state and a tensioned state, the first ring-shaped metallic decouping and sealing element elastically and sealingly tensioned radially against said first bearing cartridge end region (10) and said surrounding bearing housing first wall region (11), a second ring-shaped metallic decoupling and sealing element (9), said second ring-shaped metallic decoupling and sealing element (9) elastically deformable between an untensioned state and a tensioned state, the second ring-shaped metallic decouping and sealing element elastically and sealingly tensioned radially against said second bearing cartridge end region (13) and said surrounding bearing housing first wall region (12), wherein each of said first and second ring-shaped metallic decoupling and sealing elements (8, 9) has at least first and second axially and radially spaced apart sealing regions (14, 15), the first sealing region (14) elastically tensioned radially against the bearing cartridge end region (10, 13) by means of linear contact and the second sealing region (15) elastically tensioned radially against the surrounding bearing housing borehole first wall region (11, 12) by means of linear contact, and at least one resilient region (16) joining the first and second axially spaced apart sealing regions (14, 15) thereby centering the bearing cartridge (4) in the bearing housing borehole for forming a homogeneous oil film between the bearing cartridge (4) and bearing housing.

2. The bearing housing as claimed in claim 1, wherein the at least one ring-shaped metallic decoupling and sealing element (8, 9) is mounted with one of the sealing regions (14, 15) in a groove in the bearing cartridge (4).

3. The bearing housing as claimed in claim 1, wherein the at least one ring-shaped metallic decoupling and sealing element (8, 9) is mounted in the bearing housing borehole (3).

4. The bearing housing as claimed in claim 1, wherein the at least one ring-shaped metallic decoupling and sealing element (8, 9) is mounted with one of the sealing regions (14, 15) in a groove in the bearing housing borehole (3).

5. The bearing housing as claimed in claim 1, wherein the at least one ring-shaped metallic decoupling and sealing element (8) is a metallic ring having a sheet thickness of 0.15 mm.

6. The bearing housing as claimed in claim 1, wherein the material of the at least one ring-shaped metallic decoupling and sealing element (8) is a spring steel.

7. An exhaust gas turbocharger (2) comprising
a compressor wheel;
a turbine wheel;
a shaft (5) connecting the compressor wheel to the turbine wheel;
a bearing housing (1) for rotatingly supporting said shaft, said bearing housing (1), comprising:
an oil-lubricated bearing cartridge (4) having a one-piece cylindrical outer race having a circumferential surface (7) and having a first end region (10) and a second end region (13) as well as a cylindrical inner surface for supporting said shaft (5), wherein the bearing cartridge (4) is a rolling bearing system;
a bearing housing borehole (3) having a cylindrical inner circumferential surface having a first wall region (11) surrounding said bearing cartridge first end region (10) and a second wall region (12) surrounding said bearing cartridge second end region (13);
the bearing housing borehole first wall region (11) having an inner diameter greater than the bearing cartridge first end region (10) outer diameter, forming a gap between the first cartridge end region outer diameter and the bearing housing borehole first wall region, the bearing housing borehole second wall region (12) having an inner diameter greater than the bearing cartridge second end region (13) outer diameter, forming a gap between the second cartridge end region outer diameter (13) and the bearing housing borehole second wall region (12),
a first ring-shaped metallic decoupling and sealing element (8), said first decoupling and sealing element (8) elastically deformable between an untensioned state and a tensioned state, the metallic decouping and sealing element elastically and sealingly tensioned radially against said first bearing cartridge end region (10) and said surrounding bearing housing first wall region (11),
a second ring-shaped metallic decoupling and sealing element (9), said second decoupling and sealing element (9) elastically deformable between an untensioned state and a tensioned state, the metallic decouping and sealing element elastically and sealingly tensioned radially against said second bearing cartridge end region (13) and said surrounding bearing housing first wall region (12),
wherein each of said first and second ring-shaped metallic decoupling and sealing elements (8, 9) has at least first and second axially and radially spaced apart sealing regions (14, 15), the first sealing region (14) elastically tensioned radially against the bearing cartridge end region (10, 13) by means of linear contact and the second sealing region (15) elastically tensioned radially against the surrounding bearing housing borehole first wall region (11, 12) by means of linear contact, and at least one resilient region (16) joining the first and second axially spaced apart sealing regions (14, 15) thereby centering the bearing cartridge (4) in the bearing housing borehole for forming a homogeneous oil film between the bearing cartridge (4) and bearing housing.

* * * * *